Feb. 27, 1940.   D. E. EDGAR ET AL   2,191,957
RESINOUS COMPOSITION AND METHOD OF PREPARING SAME
Filed Jan. 7, 1936
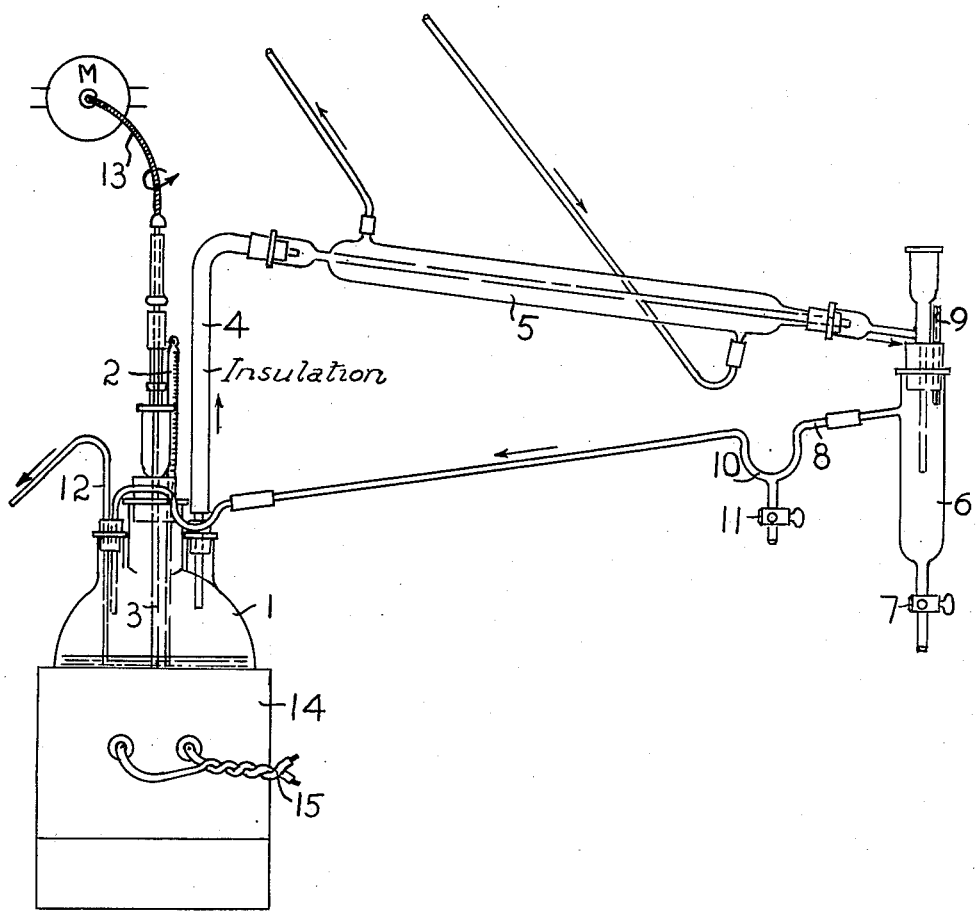
INVENTORS.
Donald E. Edgar
Paul Robinson
BY R. F. Miller
ATTORNEY.

Patented Feb. 27, 1940

2,191,957

UNITED STATES PATENT OFFICE 2,191,957

RESINOUS COMPOSITION AND METHOD OF PREPARING SAME

Donald Edwards Edgar, Philadelphia, and Paul Robinson, Llanerch, Pa., assignors to E. I. du Pont de Nemours & Company, Wilmington, Del., a corporation of Delaware Application January 7, 1936, Serial No. 58,000

8 Claims. (Cl. 260—70)

This invention relates to resinous compositions, and more particularly to the manufacture of improved urea-formaldehyde resinous compositions adapted for use as decorative and protective films as well as for the production of molded products.

The products of the reaction and/or condensation of urea and aldehydes, particularly formaldehyde, are well known in the art. These products possess desirable properties of hardness and strength and further have excellent color, transparency and fastness to light. Such products have been used within recent years quite extensively in the field of molded plastics. Practically no use, however, has been made of them in the field of coating compositions to produce decorative and protective films. This was probably because of the practical insolubility of the products in suitable solvents and the instability of such solutions as could be produced. The physical properties of the films prepared from such solutions are also quite unsatisfactory being extremely brittle and lacking in the proper toughness. The property of brittleness has also limited to some extent the use of the products in the field of molded plastics. Methods for suitably plasticizing the products used for molded plastics have been found but no satisfactory means of plasticizing the urea formaldehyde condensation products to be used as coating compositions has yet been developed. Various other types of film forming materials added to serve as plasticizers have been used but those which would appear to be desirable for this purpose were found to be unsatisfactory because of their incompatibility with the known urea-formaldehyde reaction product. Because of the desirable properties of freedom from color, transparency and fastness to light of the reaction and/or condensation products of urea and formaldehyde, film forming compositions of such products possessing in addition the properties of hardness and toughness are highly desirable from a commercial standpoint.

This invention therefore presents as an object the preparation of a condensation product of urea and formaldehyde which possesses improved flexibility and toughness over the condensation products heretofore made. Another object is a process for the preparation of a condensation product of urea and formaldehyde which is compatible with the desirable types of plasticizers and other film forming materials and further is soluble in desirable solvents for commercial use such as hydrocarbons. A still further object is the production of new and useful coating compositions comprising a condensation product of a urea and formaldehyde used in admixture with other film forming materials such as raw and treated animal and vegetable oils, natural resins, synthetic resins, plasticizers, waxes, etc.

These and other objects are accomplished by the following invention in which an alcohol is used as a reactant in addition to the urea and formaldehyde, the reaction being carried out in the presence of a suitable solvent in such manner that substantially 2 molecules of water for each molecule of urea are eliminated and the resulting product contains an amount of combined alcohol equivalent to from about one-half to about one molecule of alcohol for each molecule of urea.

The attached drawing shows in elevation a diagrammatic representation of apparatus suitable for carrying out the invention.

The apparatus consists essentially of a reaction vessel or still 1 provided with a thermometer 2 and a mechanical stirrer 3 driven by a suitable source of power M applied through the cable 13 to the stirrer shaft. A tube 4 from the still leads to the top of a separator 6 by means of the tube 25 passing through the water cooled condenser 5. The separator 6 is open to the atmosphere at 9 and is provided with an outlet at its lower end closed by a valve 7. The separator near its top opens into a tube 8 for the gravity passage of fluid into the still 1 as shown. The tube 8 has a trap 10 provided with a valved outlet 11. The still is open to atmospheric pressure by means of tube 12. The numeral 14 designates a suitable heating element connected to a source of current by leads 15.

The manner of carrying out the present invention will be more fully understood by the following examples which are given by way of illustration but not by way of limitation except as defined in the appended claims.

Example I 1000 parts by weight of normal butyl alcohol and 250 parts by weight of para-formaldehyde are placed in the still or reaction vessel 1. To this is added 2 parts by weight of sodium hydroxide and the mixture is stirred with slight heating until the para-formaldehyde is in solution after which 10 parts of phthalic anhydride are added and the heating continued until the anhydride is in solution. There are then added 250 parts by weight of urea, the urea being added in small portions at a time each portion being allowed to dissolve before a subsequent portion is added.

After all the urea has been added 80 parts by weight of toluol are introduced into the reaction vessel. Heat is then applied to the still or reaction vessel 1 and the distillation which follows is allowed to proceed at a fairly rapid rate. The liquid which is condensed in the condenser 5 is passed into the separator 6 where it separates into two layers with the organic solvent material forming the upper layer of the liquid in the separator. This material is allowed to return through the return tube 8 to the reaction vessel 1. The water is drawn off through the separator tube by opening the valve 7. Distillation is continued until substantially 2 molecules of water have been eliminated from the mass in the reaction vessel 1. The distillation is then continued beyond this point and the distillate not returned to the reaction vessel but removed from the separator as the water is in the early part of the process. This continued distillation results in practically complete removal of water from the reaction vessel and also in a concentration of the solution in the reaction vessel.

The amount of water actually formed during the reaction may be determined by adding the amount measured as it is removed from the separator to the amount which remains dissolved in the organic liquid which is finally retained in the separator. The latter figure is determined with the aid of known solubility data of water in the organic liquid. The resulting product contains, as determined by analysis, approximately between 19 and 23% of nitrogen based on the solids and has been found of value when used as such in forming coating compositions.

Example II 1600 parts by weight of aqueous formaldehyde containing approximately 37% of formaldehyde in solution are placed in a suitable container and 19 grams of sodium acid phosphate ($Na_2H_2PO_4$) added. The resulting solution is adjusted to a pH of 7.6 by the addition of a solution of sodium hydroxide, the amount required depending upon the acidity of the formaldehyde solution used. 540 parts by weight of urea are then dissolved in the formaldehyde solution and the mixture allowed to stand for approximately 96 hours, the temperature being maintained below 30° C., preferably between 20 and 30° C., by means of a cooling coil placed in the liquid or other suitable means. Crystallization of the reaction material sets in usually within from 12 to 24 hours and after a period of 96 hours the container will be found to contain a practically solid mass of crystals. The crystals are filtered and dried and a yield of about 85% of the theoretical available is obtained. This dried reaction product of urea and formaldehyde is used as the intermediate A in the next step of the process.

1500 parts by weight of isobutyl alcohol are placed in a still or reaction vessel 1. 100 parts by weight of toluol are then added, followed by the addition of 750 parts by weight of the intermediate product A referred to above and then 15 parts by weight of phthalic anhydride are added. The distillation is allowed to proceed as in Example I until separation of the water from the distillate received in the separator has practically ceased.

The material prepared as described possesses sufficient flexibility for many purposes but may be advantageously blended with other film forming materials as alkyd resins, other types of synthetic resins, oleo-resinous varnishes, lacquers prepared from cellulose nitrate, ethyl cellulose, benzyl cellulose, etc., as well as with drying oils, non-drying oils and waxes. Further the material may be blended with natural resins such as Congo, copal, dammar, etc. For certain purposes it may be desired to obtain a more flexible film in which instance the material may be blended with solvent plasticizers such as dibutyl phthalate, tricresyl phosphate, triphenyl phosphate, dicyclohexyl phthalate, camphor, ethyl tartrate, butyl tartrate, ethyl lactate, butyl lactate, etc. either with or without other blending materials as noted above.

Compositions thus prepared will harden to satisfactory films on exposure to the air for several days but may be baked at relatively low temperatures for a period of time such as at 100° C. for 15 minutes after which hard and tough films will be produced. If desired baking may be carried out at higher temperatures such as for example, 150° C. for 1 hour in which instance films having increased water resistance are produced. Even higher temperatures may be used in which instances proportionately shorter periods of time for baking will be necessary. The choice of the temperature at which the compositions suitably applied are baked and the time periods of such baking will depend on the particular properties desired in the finished films and will be readily apparent to those familiar with the art of producing such films from such resinous compositions.

The material has been found particularly advantageous for use where it is desirable to apply heavy or thick coatings to produce the finished film. Further the composition as prepared in this example may be used for coating various types of articles and after the practically complete removal of the solvent may be used as a molding material. Pigments and dyes may be incorporated to produce desired color in the finished product. Fillers may also be used.

In place of urea, substituted ureas such as alkyl, aryl and acyl ureas, thio-ureas, guanidine and substituted guanidines may be used. In using such substituted ureas it is preferred to use the procedure as described in Example I in order to obtain the most satisfactory products.

In place of butyl alcohol other aliphatic monohydric alcohols such as methyl, ethyl and propyl alcohol may be used, proper adjustment being made as to the relation between the quantity of alcohol and hydrocarbon such as benzene or toluene, in order to permit the proper separation of the water from the organic liquid as the distillate is collected in the separator. Higher alcohols such as benzyl, cyclohexyl and octyl alcohol may be used although their use is not preferred in most instances since the products are not in general as soluble as those prepared from the lower alkyl alcohols. Benzene and other hydrocarbons may be used in place of the toluol which is given in the examples. With the use of some alcohols it may not be necessary to use in addition a hydrocarbon since the water may be satisfactorily removed by other means, as for instance by the use of silica gel in the separator, or by the use of an auxiliary fractionating column to separate the water from the alcohol before the latter is returned to the reaction vessel.

In addition to the phthalic anhydride noted in the examples as the catalyst other materials of an acidic nature such as benzoic and similar monocarboxylic acids, maleic acid, adipic acid and similar dicarboxylic acids as well as such tricarboxylic acids as citric acid, also acid salts and acid resins such as rosin, etc. and alkyd type resins may be used. Further inorganic acids as hydrochloric, sulphuric and phosphoric acid are satisfactory. In addition certain inorganic salts as mercuric-chloride, aluminum chloride, stannic chloride as well as the halogens as bromine and iodine may be used. Also benzoyl peroxide.

The product of the process of the present invention is particularly adaptable for use as a protective and decorative coating on various types of surfaces as metal, wood, glass, hard rubber, molded plastic, synthetic resin products, etc. and may be applied by methods well known in the art as by spraying, brushing or dipping. When combined with other film forming ingredients as previously noted, compositions possessing varying properties may be obtained, depending on the particular application of the finished product. When used with cellulose derivatives baking at elevated temperatures is not necessary or desirable since the product will satisfactorily air dry. When combined with film forming materials other than cellulose derivatives, however, baking at elevated temperatures for a short period of time is usually desirable from an economic standpoint.

The compositions of the process of the present invention are useful as protective and decorative coatings for fabrics of various kinds such as woven fabrics of cotton, wool, silk and various types of rayon such as prepared from viscose, cellulose acetate, cuprammonium cellulose, cellulose nitrate, etc. for paper which may vary from the heavier to the lighter weight materials as well as other flexible bases such as leather in which case the composition has been found to produce a patent leather finish of high quality. Fabrics coated with the compositions used as such or blended with other film forming materials are waterproof and cleanable, do not become sticky on exposure to reasonably elevated temperatures and do not become unduly stiff at lowered temperatures. Such materials possess many desirable properties. Uses for the coated products mentioned above are, for example, shower curtains, glazed chintzes, rain coats and capes, tobacco pouches, glazed cambrics for insulation purposes in the electrical industry, etc. Paper of the so-called Glassine type treated with the compositions produces a waterproof and grease-proof material which finds application as a wrapping material for either decorative or protective purposes. Such material may be made either transparent or translucent as will be readily apparent to those skilled in the art. A very thin special type paper sheet treated with suitably blended compositions produces a satisfactory product for use as a base for mimeograph sheets.

When suitably blended our improved compositions may be applied to regenerated cellulose sheet material to impart desirable properties to the product. Further the material is adaptable to the impregnation of fibrous felted cellulosic sheet material for use in the manufacture of floor coverings of various types, and the like. Such material if desired may be formed into various shapes by means of heat and pressure and used, for example, as box toes and counters in the shoe industry. Woven fabrics usually of the sheeting or square weave type coated on both faces with compositions as such or suitably blended with other materials produce a product which finds valuable uses as a material for diaphragms in various types of fuel pumps where resistance to gasoline and similar materials is a requirement. In the manufacture of abrasive sheet materials the products of the invention are particularly adaptable for use as the adhesive for the abrasive to the base sheet. The compositions may be used as adhesives in general or for uniting various types of sheet material such as fabric to fabric, metal to metal, or metal to fabric, paper, regenerated cellulose, Celluloid or any combination of these materials and for making plywood, applying veneer, etc.

In the electrical industry the material is adapted for impregnating coils of various types such as are used either as rotors or stators. The material may also be used as the adhesive in the manufacture of regenerated cellulose covered wire as is used in the electrical industry. Rubber coated wire may be treated with the composition as such or blended with other suitable materials and such rubber coated material having a further covering of a woven fabric may be impregnated with the composition. The compositions may be used as stiffening agents for felt, straw, etc.

Products of the process of the present invention from which the solvent has been removed are found to yield on treatment with zinc chloride and acetic anhydride the acetate of the alcohol used in the process. For example, where butyl alcohol is used the above treatment yields butyl acetate. Similarly where other alcohols are used in the process the corresponding acetates are formed upon treatment of the product with the zinc chloride and acetic anhydride.

It will be seen from the foregoing that our improved resinous composition comprising the reaction product of urea, an aldehyde, and an alcohol may be prepared in such form as to be readily used as a protective and decorative coating composition either as such or in combination with other film forming materials to produce films which are hard, tough and water resistant.

As many apparently widely different embodiments of this invention may be made without departing from the spirit and scope thereof, it is to be understood that we do not limit ourselves to the specific embodiments thereof except as defined in the appended claims.

We claim:

1. In a process for making resins the steps comprising heating in the presence of a catalyst at atmospheric pressure a reaction mixture consisting essentially of a monohydric aliphatic alcohol and the reaction product obtained from a urea and formaldehyde as the essential reactants, distilling and condensing the mixed vapors of alcohol and water evolved, separating the water from the condensate and returning the alcohol from which the water has been separated to said reaction mixture, and continuing said heating with separation of water and return of alcohol to the reaction mixture until substantially two molecules of water for each molecule of combined urea are eliminated and a product is obtained which contains an amount of combined monohydric alcohol equivalent to from one-half to about one molecule of alcohol for each molecule of combined urea.

2. A process for making resins which comprises heating in the presence of a catalyst and a volatile hydrocarbon solvent, a reaction mixture comprising essentially monohydric aliphatic alcohol and the reaction product obtained from a urea and formaldehyde as the essential reactants, condensing the evolved vapors, separating the water from the condensate and returning to the reaction mixture the substantially water-free solvent, and continuing the process until substantially two molecules of water for each molecule of combined urea are eliminated and a product is obtained which contains an amount of combined monohydric alcohol equivalent to from one-half to about one molecule of alcohol for each molecule of combined urea.

3. The process set forth in claim 1 in which said catalyst is an acid catalyst.

4. The process set forth in claim 1 in which said catalyst is an acid resin.

5. The process set forth in claim 1 in which said catalyst is a halogen.

6. The process set forth in claim 1 in which said catalyst is a chloride of a polyvalent metal.

7. The resinous reaction product of urea, formaldehyde, and an aliphatic monohydric alcohol, said product containing said alcohol in combined form in amount of from about one-half to about one molecule of alcohol for each molecule of combined urea, said product yielding upon treatment with zinc chloride and acetic anhydride the acetate of said alcohol, said resinous reaction product yielding water-insoluble films.

8. In a process for reacting in the presence of an acid catalyst ingredients consisting essentially of a urea, formaldehyde and n-butyl alcohol, the steps comprising heating at atmospheric pressure a reaction mixture of said alcohol and the reaction product of urea and formaldehyde, distilling and condensing the mixed vapors of alcohol and water evolved, separating the water from the condensate and returning the alcohol from which the water has been separated to said reaction mixture, and continuing said heating with separation of water and return of alcohol to the reaction mixture until substantially two molecules of water for each molecule of urea are eliminated and a product is obtained which contains combined urea, formaldehyde and n-butyl alcohol.

DONALD EDWARDS EDGAR.
PAUL ROBINSON.

DISCLAIMER 2,191,957.—*Donald Edwards Edgar*, Philadelphia, and *Paul Robinson*, Llanerch, Pa. RESINOUS COMPOSITION AND METHOD OF PREPARING SAME. Patent dated Feb. 27, 1940. Disclaimer filed June 20, 1947, by the assignee, *E. I. du Pont de Nemours & Company*.

Hereby disclaims all products covered by claim 7 from which there have been eliminated less than substantially 2 molecules of water for each molecule of combined urea.

[*Official Gazette July 22, 1947.*]